(12) United States Patent
Thomas et al.

(10) Patent No.: US 7,652,615 B2
(45) Date of Patent: Jan. 26, 2010

(54) METHODS AND SYSTEMS PROVIDING AN ADAPTIVE THRESHOLD FOR A BEAM SHARPENED PULSE RADAR

(76) Inventors: Steven H. Thomas, 1708 Irving La., Brooklyn Center, MN (US) 55430; Timothy J. Reilly, 16625 14$^{th}$ Ave. North, Plymouth, MN (US) 55447; Benjamin J. Winstead, 1048 Roselawn Ave. West, Roseville, MN (US) 55113

( * ) Notice: Subject to any disclaimer, the term of this patent is extended or adjusted under 35 U.S.C. 154(b) by 299 days.

(21) Appl. No.: 11/420,574

(22) Filed: May 26, 2006

(65) Prior Publication Data

US 2007/0273572 A1 Nov. 29, 2007

(51) Int. Cl.
*G01S 13/00* (2006.01)

(52) U.S. Cl. .................... 342/68; 342/120; 342/94; 342/91; 342/109; 342/110

(58) Field of Classification Search .................... 342/61, 342/68, 78, 85, 101, 94, 120, 123, 136, 160
See application file for complete search history.

(56) References Cited

U.S. PATENT DOCUMENTS

| | | | |
|---|---|---|---|
| 4,118,702 A | 10/1978 | Rabinow | |
| 4,119,039 A | 10/1978 | Wilkins et al. | |
| 4,158,842 A | 6/1979 | Clemens et al. | |
| 4,589,610 A | 5/1986 | Schmidt | |
| 4,599,616 A | 7/1986 | Barbella et al. | |
| 5,426,435 A * | 6/1995 | Moore et al. | .......... 342/68 |
| 5,539,410 A | 7/1996 | Zveglich | |
| 5,574,462 A | 11/1996 | Schmucker et al. | |
| 5,617,097 A | 4/1997 | Gavnoudias | |
| 5,644,099 A | 7/1997 | Rabbow et al. | |
| 5,696,347 A | 12/1997 | Sebeny, Jr. et al. | |
| 5,936,233 A | 8/1999 | Nunnally | |
| 6,216,595 B1 | 4/2001 | Lamorlette et al. | |
| 6,292,751 B1 | 9/2001 | Frank | |
| 6,389,974 B1 | 5/2002 | Foster | |
| 6,834,591 B2 * | 12/2004 | Rawcliffe et al. | .......... 342/68 |
| 7,095,348 B1 * | 8/2006 | Sutardja et al. | .......... 341/144 |
| 2001/0015396 A1 | 8/2001 | Linick | |
| 2004/0215419 A1 | 10/2004 | Havens | |
| 2005/0188826 A1 | 9/2005 | McKendree et al. | |
| 2006/0103570 A1* | 5/2006 | Hager et al. | .......... 342/68 |

* cited by examiner

*Primary Examiner*—Thomas H Tarcza
*Assistant Examiner*—Timothy A Brainard
(74) *Attorney, Agent, or Firm*—Fogg & Powers LLC

(57) ABSTRACT

A radar sensor is described that includes a radar transmitter, a radar receiver configured to receive reflected returns of signals output by the radar transmitter, and a signal processing unit configured to process signals received by the radar receiver. The signal processing unit includes a comparator, a first filter comprising an output coupled to a reference input of the comparator, and a second filter comprising an output coupled to a signal input of the comparator. The first and second filters are configured to receive a common input related to the reflected returns. The first filter is configured to have a time constant such that a rise time of the first filter output is faster than a rise time of the second filter output.

5 Claims, 9 Drawing Sheets

Pre-launch/Launch:
MGC Sends HOB Sensor Burst Altitude Calibration Coefficients Continuously Computed MGC Commands at 2250 Meters:
1. HOB Sensor Enabled
2. MGC Begins Sending Vertical Velocity to the HOB Sensor at Approx 25 Hz At 33 Meters:
HOB Detects Calibrated Reference Altitude MGC 10 to 30 Meters Preset Reference Altitude Range

METHODS AND SYSTEMS PROVIDING AN ADAPTIVE THRESHOLD FOR A BEAM SHARPENED PULSE RADAR

BACKGROUND OF THE INVENTION

This invention relates generally to pulse radar operation, and more specifically, to methods and systems that provide an adaptive threshold for beam sharpening within a pulse Doppler radar.

There have been recent developments, for example, relating to the control of a detonation altitude in pulse radar equipped munitions. At least one of these developments utilizes beam sharpening with respect to transmissions from the munitions. This development makes use of the Doppler component on the radar signal to sharpen the beam which limits the forward view of the missile such that it looks along a velocity vector of the falling missile. Conceptually, sharpening the beam involves tuning a band-pass filter to the expected velocity of a missile, which is typically derived inertially within the missile. Objects to the side of the missile have lower Doppler frequencies and therefore a bandwidth of the filter limits the extent that the radar sees to the side of the missile.

Once the weapon reaches a specified reference altitude, which in at least one application involves using a range gate for processing the radar returns, the return Doppler signals are processed by integrating these return signals until a tracking threshold is reached. Once the returns are indicative of a valid tracking signal, then by knowing the reference altitude, the velocity of the weapon, and the preset detonation altitude, timing can be predicted as to when the detonation signal must trigger (e.g., provide) a fusing signal.

Accurate timing of the detonation signal is dependent on the integration time of the received Doppler signals and knowing when the valid tracking threshold has been achieved. Typically, a continuum of Doppler frequencies are received across a surface area of the field of view of the Doppler processor. The maximum Doppler frequency and amplitude occurs directly underneath the weapon system (i.e. maximum closing velocity). The other Doppler frequencies, which occur at lower frequencies, and their corresponding amplitudes contribute to an integrated solution in the Doppler filter, which is typically a band pass filter.

A problem arises due to the nature of band pass filters. The time delay through band pass filters varies as a function of the input frequencies. In particular, frequencies an octave or two from the pass band edges of the filter have much faster rise times than the desired center although their amplitudes are reduced. Since the radar will see a continuum of Doppler frequencies and because it has a very high sensitivity, the munitions may detonate on these side components resulting in errors in the detonation altitude.

Additionally, tuning the filter such that the upper pass-band edge corresponds to the Doppler frequency of the vertical component of the missile velocity is not an acceptable solution because of the additional 3 dB loss and the filter no longer acts as an integrator of Radar pulses. Coherent integration of the radar return pulses is needed to achieve sufficient sensitivity and reduced susceptibility to jamming.

BRIEF DESCRIPTION OF THE INVENTION

In one aspect, a radar sensor comprising a radar transmitter, a radar receiver configured to receive reflected returns of signals output by the radar transmitter, and a signal processing unit configured to process signals received by the radar receiver is provided. The signal processing unit includes a comparator, a first filter comprising an output coupled to a reference input of the comparator, and a second filter comprising an output coupled to a signal input of the comparator. The first and second filters are configured to receive a common input related to the reflected returns, and the first filter is configured to have a time constant such that a rise time of the first filter output is faster than a rise time of the second filter output.

In another aspect, a method for generating a weapon detonation signal at a desired weapon detonation altitude is provided. The method comprises applying radar return signals to a radar range gate, the radar range gate set to correspond to a reference altitude, applying an output of the radar range gate to first and second filters, and initiating a countdown to detonation when an output of the second filter attains an amplitude greater than an output of the first filter.

In still another aspect, a munition is provided that comprises a radar processing circuit and a circuit for initiating a detonation signal for said munition. The radar processing circuit includes a band pass filter configured to receive radar signal returns, and a unit configured to determine whether a signal received from the band pass filter is close enough to a center frequency of the band pass filter to output a signal to initiate a detonation sequence. The circuit for initiating a detonation signal for the munition operates based on a state of a signal received from the unit.

DETAILED DESCRIPTION OF THE INVENTION

Figure 1:
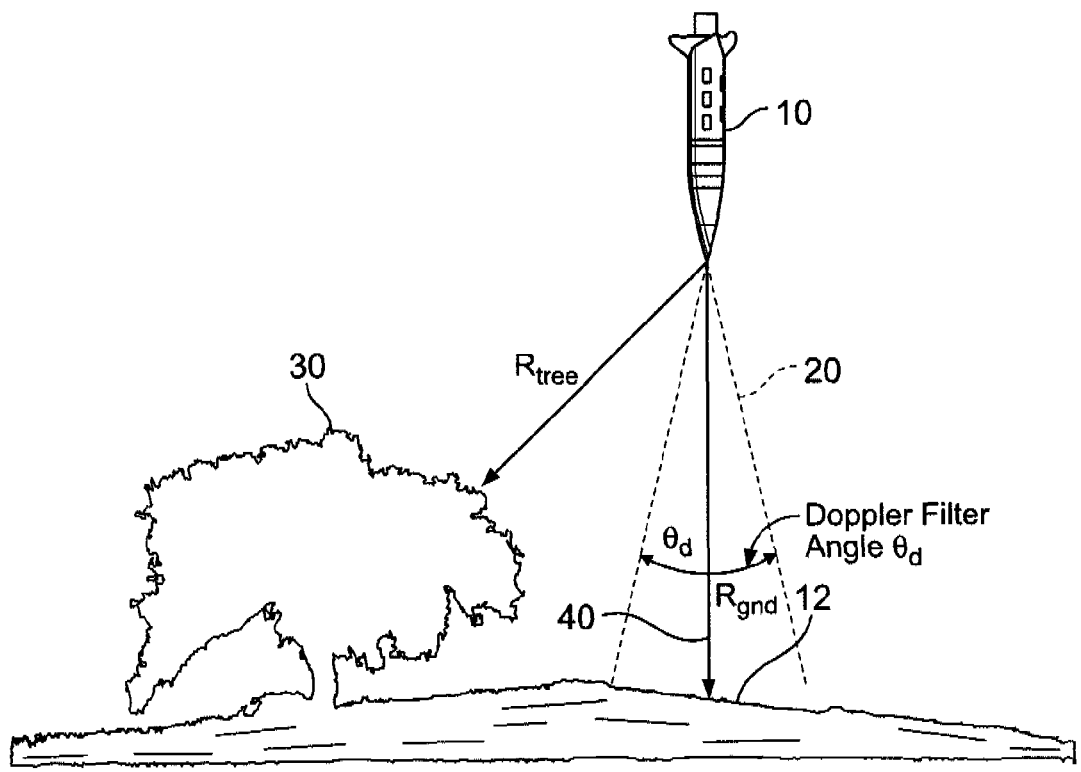
FIG. 1 is an illustration of Doppler filter beam limiting.

FIG. 1 is an illustration of radar beam sharpening related to a weapon 10 approaching a target 12. More specifically, Doppler components of the radar return signal are band pass filtered to restrict the field of view of the radar. By restricting the filter bandwidth the radar field of view can be limited to a maximum Doppler angle. Restricting the width to that of the Doppler filter angle, as illustrated in FIG. 1, ensures that radar returns reflecting from tree 30 are not processed by the receiver of the radar and the forward view of weapon 10 is restricted to be along a velocity vector 40. With respect to the radar receiver, the band pass filter is tuned to a center frequency consistent with an expected velocity of a the weapon 10, which is typically derived inertially. Objects providing radar returns that are not along the velocity vector 40 (e.g., off to the side of the missile trajectory) have lower Doppler frequencies and are outside the Doppler filter angle and hence the bandwidth of the filter limits the extent that the radar within weapon 10 processes returns from such objects.

Figure 2:
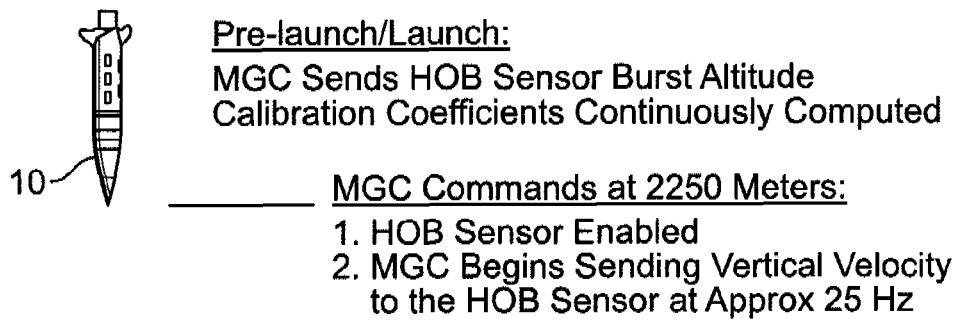
FIG. 2 is an illustration of an example weapon detonation sequence, based on a velocity of the weapon.
Figure 2:
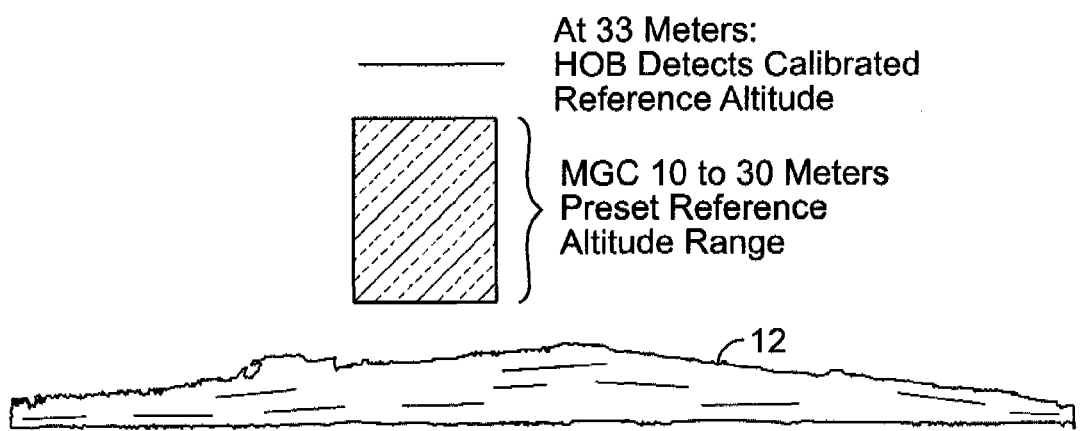

FIG. 2 is an illustration of an operating sequence 50 associated with the detonation of weapon 10. A detonation altitude for weapon 10 is sometimes referred to as a height of burst (HOB). Prior to launch of weapon 10, a device, for example, a missile guidance computer within weapon 10 is configured with a desired detonation altitude (HOB) and a reference altitude. At a first altitude, for example and as illustrated, 2250 meters, a detonation sensor is enabled and the missile guidance computer begins to provide the detonation sensor with a vertical velocity of the weapon 10, typically determined inertially, at a rate, for example, at about 25 Hz. Once weapon 10 reaches the reference altitude, which is illustrated as 33 meters, and typically determined using a radar range gate, a sensor processes the radar return Doppler signals by integrating these signals until they reach a track threshold.

Once a valid tracking signal is received, then knowing the reference altitude, the velocity of weapon 10, and the desired detonation altitude, timing can be predicted as to when the detonation signal must be triggered or a fusing signal is provided. For example, if the velocity of weapon 10 is 200 meters/sec, the reference altitude is 33.26 meters and the desired detonation altitude is 10 meters, then the time to trigger would be (33.26 meters–10 meters)/200 meters/sec =116 milliseconds.

Figure 3:
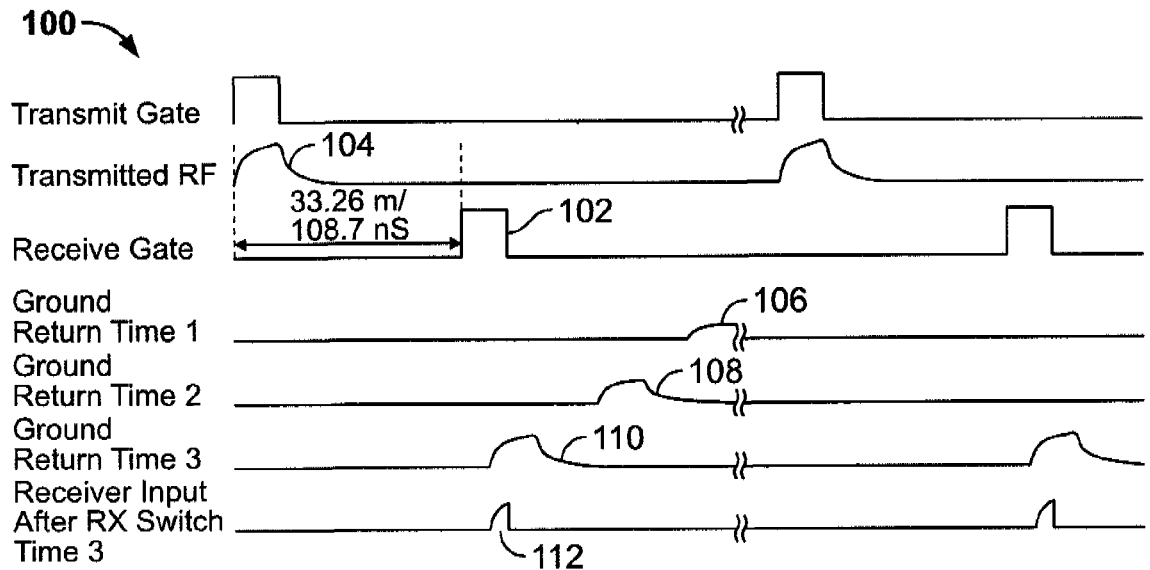
FIG. 3 is a timing sequence illustrating operation of a radar utilized in detonation of weapons.

FIG. 3 is a timing diagram 100 that illustrates the process described with respect to FIG. 2 where the range gate 102 occurs at a "distance" of 33.26 meters from a transmit pulse 104. Ground returns 106, 108, and 110 illustrate the reduction in time between the transmit pulse 104 and the ground return as weapon 10 approaches ground 12. As weapon 10 begins to approach the 33.26 meter altitude, a portion of the ground return 110 is aligned with range gate 102, resulting in a receiver input signal 112. Once signal 112 is of sufficient amplitude to be tracked, the time to trigger count is initiated.

Figure 4:
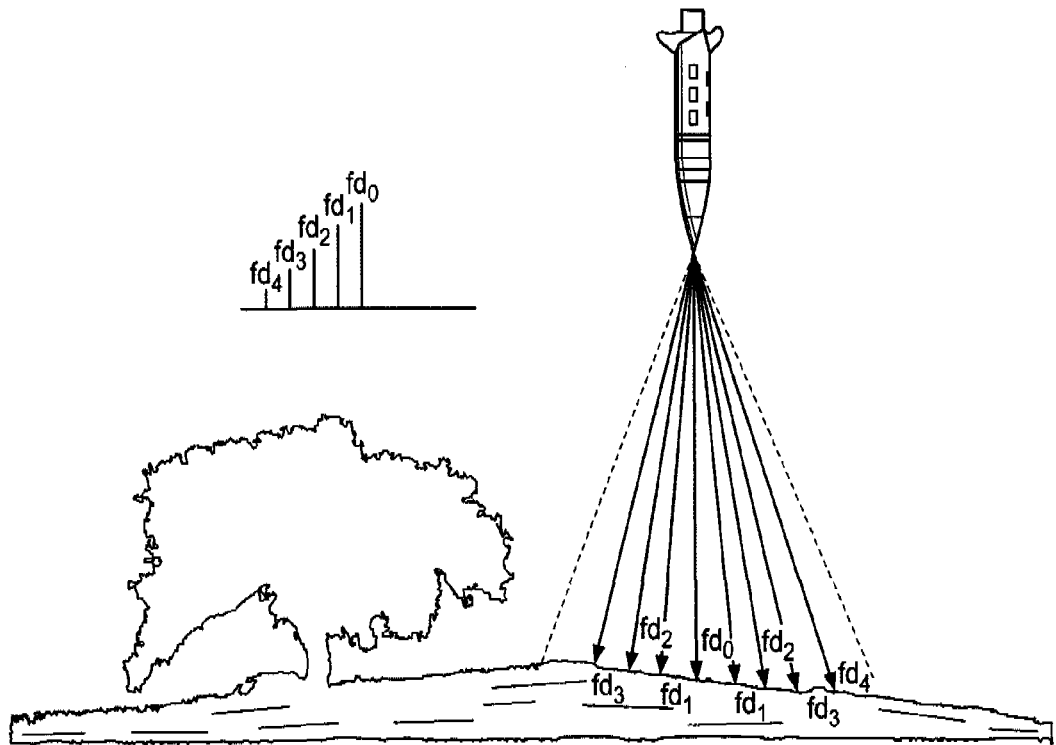
FIG. 4 is an illustration of Doppler signal returns.

Accurate timing for the detonation of weapon 10 (e.g., generation of a fusing signal or triggering signal) is dependent on the integration time of the Doppler signals in the radar return signals and knowing when the track threshold has been achieved. FIG. 4 illustrates that a continuum of Doppler frequencies ($fd_0$, $fd_1$, $fd_2$, $fd_3$, and $fd_4$) are actually received across the field of view of the Doppler processor within the radar receiver of weapon 10. The maximum Doppler frequency and amplitude occurs directly underneath the weapon system (i.e. maximum closing velocity), represented by $fd_0$. The other Doppler frequencies, which are lower frequencies, and their corresponding amplitudes contribute to the integrated solution in the Doppler filter, which as described above is a band pass filter.

Figure 5:
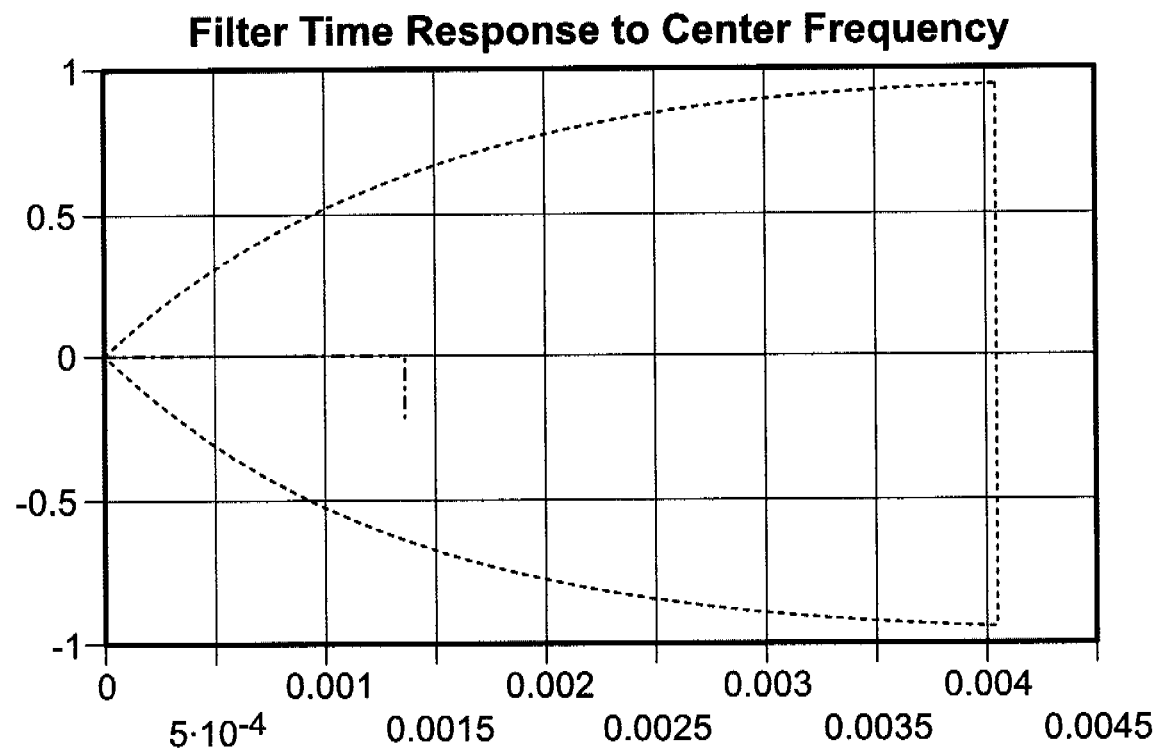
FIG. 5 is an illustration of a band pass filter response at a center frequency.
Figure 6:
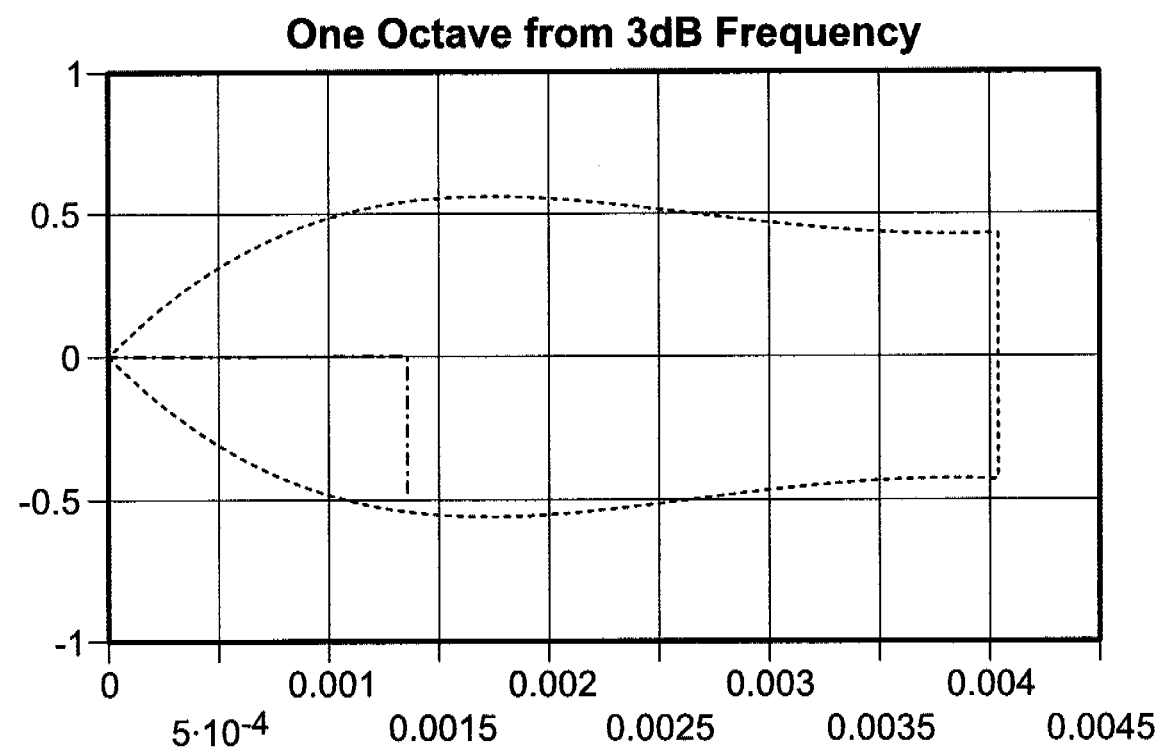
FIG. 6 is an illustration of a band pass filter response at a frequency one octave from the center frequency.
Figure 7:
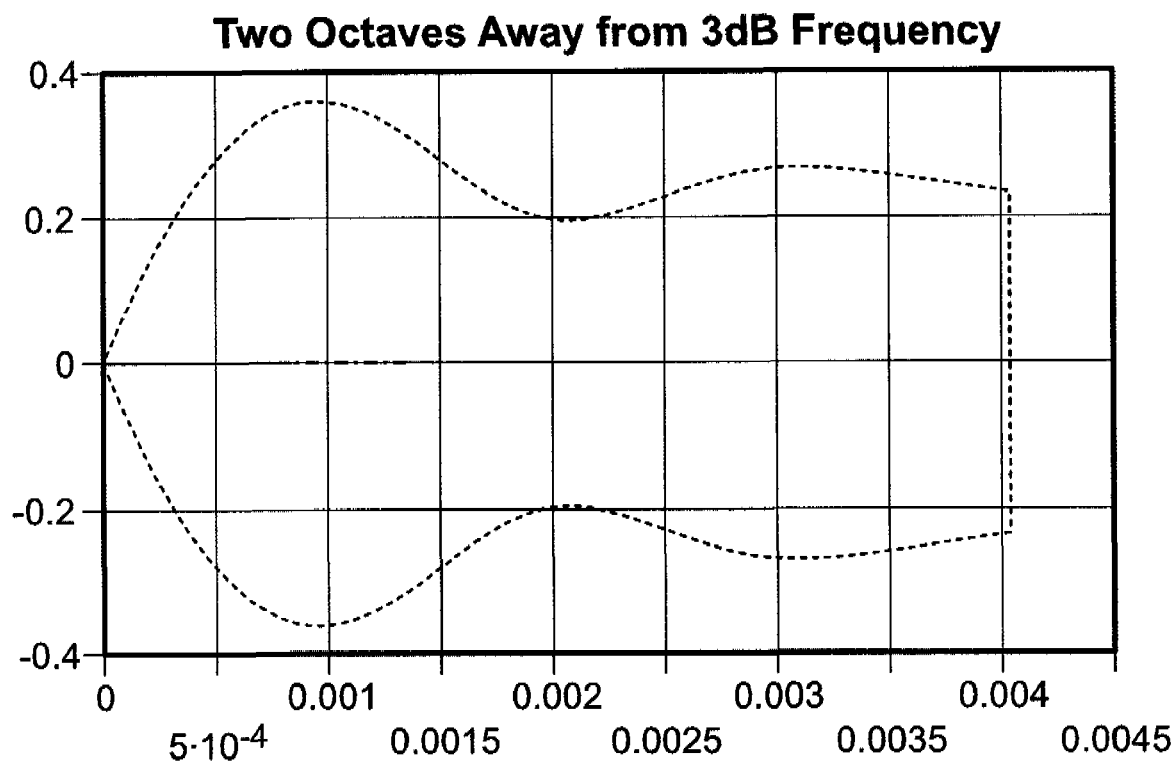
FIG. 7 is an illustration of a band pass filter response at a frequency two octaves from the center frequency.

However, a problem may occur in the processing of the Doppler signals due to the nature of band-pass filters. Specifically, a time delay through a band pass filter varies as a function of the input frequencies. FIG. 5 is a graph 150 of a typical band pass filter response over time at or about the center frequency and attenuation of the response inversely proportional to a passage of time is easily discerned. FIG. 6 is a graph 200 illustrating a response of a band pass filter at a frequency one octave away from one of the 3 dB frequencies of the filter and FIG. 7 is a graph 250 illustrating a response of a band pass filter at a frequency two octaves away from one of the 3 dB frequencies of the filter. In particular and by way of example, frequencies an octave or two from edges of the pass band of the filter have much faster rise times than frequencies near the center frequency of the filter although their amplitudes are reduced. Since the radar of weapon 10 will see multiple Doppler frequencies (as shown in FIG. 4) and because it has a very high sensitivity, the detonation may be triggered first by one of these side components resulting in fusing errors.

Additionally, tuning the band pass (Doppler) filter such that the upper pass band edge corresponds to the Doppler frequency of the vertical component of the missile velocity is not an acceptable solution because of the additional 3 dB loss. Additionally, the band pass filter will no longer act as an integrator of the received radar pulses. Coherent integration of the return pulses is required to achieve sufficient sensitivity and reduced susceptibility to jamming.

Summarizing the above, the time response of band pass filters varies as a function of the input frequencies. The radar receives a continuum of frequencies, as shown in FIG. 4, and the band pass filter rejects Doppler frequencies which correspond to less than the missile velocity. The response at the filter pass band edge will be down by 3 dB. Frequencies close to the filter center frequency have a slower time response than frequencies an octave or more from a pass band edge. A concern is that a strong off-axis target will jump over the comparator threshold and falsely trip, indicating a reference altitude even though the subsequent true ground target will have a much stronger amplitude.

Figure 8:
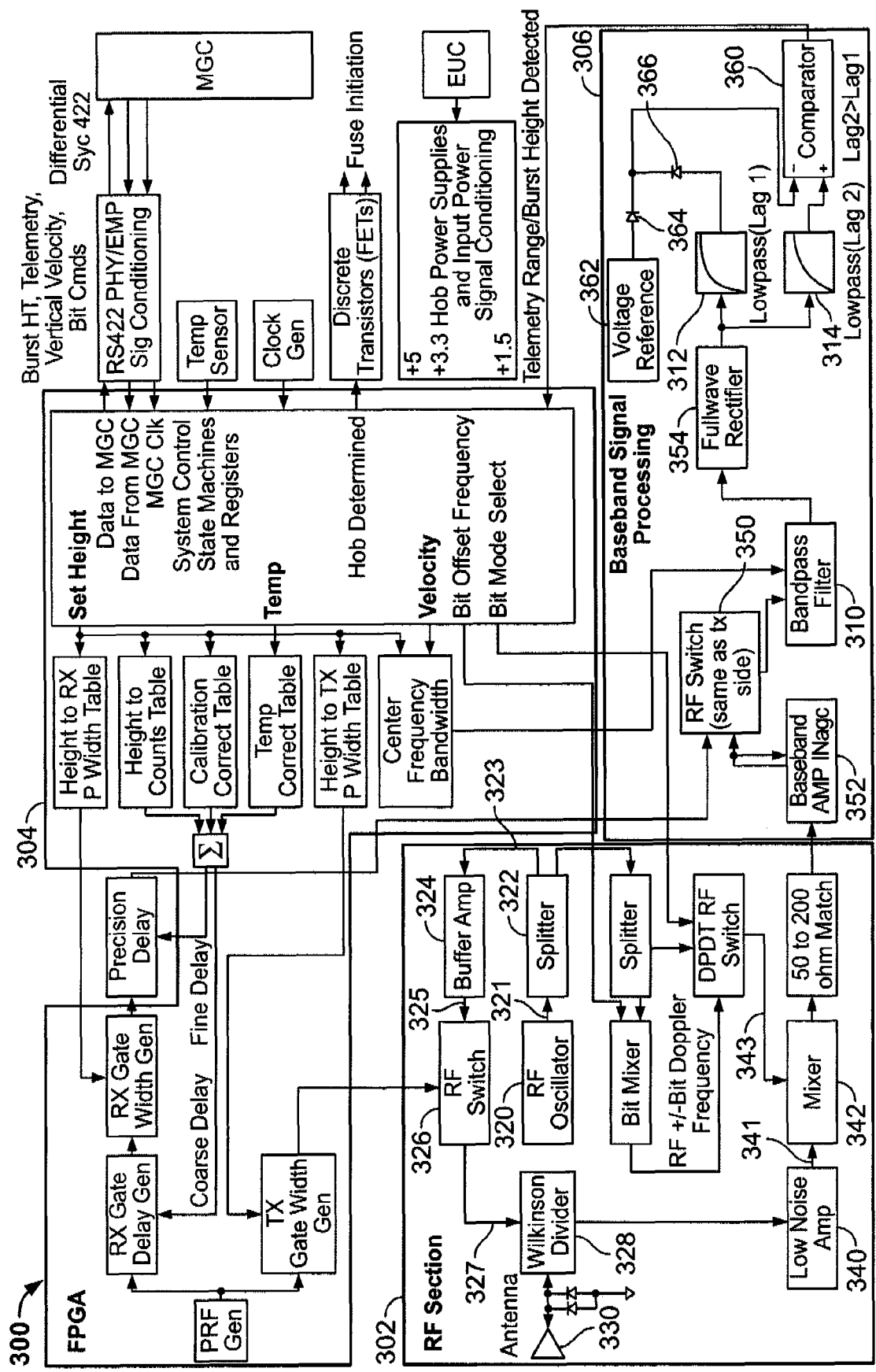
FIG. 8 is a block diagram of a radar altimeter based system for detonating weapons including a processing circuit which is configured to prevent false detonations.

FIG. 8 is a block diagram of a radar system 300 (an altitude sensor) that is utilized within a weapon, for example, weapon 10 for controlling a detonation altitude of the weapon. More specifically, radar system 300 includes a circuit implementation that utilizes dual lag circuits to provide a method of determining when the timing delay for the detonation signal should start. In the embodiment illustrated, radar system 300 includes an RF section 302, a field programmable gate array 304 that provides a range gating function, and a signal processing function 306 that includes a band pass filter 310 as well as two low pass, lag filters 312 and 314. Low pass, lag filter 312 and low pass, lag filter 314 receive signals from band pass filter 310 after they have been rectified by propagating through rectifiers 314 and 316 respectively.

Now referring to the remainder of radar system 300, RF section 302 includes a radar transmitter that includes an RF oscillator 320 that provides a frequency source for transmission and for down conversion of radar return pulses. More specifically, and with respect to transmission, RF oscillator 52 provides an RF frequency signal 321 to a power divider or splitter 322. Splitter 322 outputs a RF signal 323 to a buffer amplifier 324, which outputs an amplified RF signal 325 for transmission. The amplified RF signal 325 for transmission is provided to an modulator (RF) switch 326, which, depending on a state of modulator switch 326, modulates the amplified RF signal and routes the modulated output signal 327 to a transmit/receive switch 328 and on through transmit antenna 330 for transmission as a radar signal towards the ground.

Modulator switch 326 provides pulse modulation of amplified RF signal 325. Buffer amplifier 324 provides isolation to RF oscillator 320 from impedance variations caused by modulation switch 326. Such isolation reduces oscillator frequency pulling during transmission, to a tolerable level, which allows the radar signal return frequency to remain within a pass band of the radar receiver portion of RF section 302. Oscillator load pulling is sometimes caused by load impedance changes present at an output of the oscillator. For example, as the impedance at the oscillator varies, the frequency of the oscillator varies somewhat. Modulation switch 326 output impedance varies as the "switch" is opened and closed, which causes load pulling. Such load pulling can cause a problem in a radar if the transmit oscillator is also utilized as the frequency source for receiver down conversion. The difference between the frequency transmitted and the frequency used to down convert the return signal at the mixer, must be low enough such that the down converted return signal with its Doppler shift plus any load pulling is within the bounds of the receiver bandwidth.

Now referring to a radar receiver portion of RF section 302, radar signals transmitted utilizing antenna 330, when switch 326 closes and applies a radio frequency signal to the Wilkinson divider/combiner 328 which in the transmit condition feeds the antenna 330. Half of the transmitter power and received power is wasted in the combiner 328, but this is not an issue in a low altitude receiver. The transmitted signal is reflected by the ground and received by antenna 330 as radar ground return pulses. The received signal is split in the Wilkinson divider/combiner 328 and applied to a low noise amplifier 340 whose output 341 is input to a mixer 342 which receives a portion of the signal 343 originating from RF oscillator 320. Mixer 342 then down converts (demodulates) the radar return pulses based upon signal 343, the demodulated signal being output to the base band signal processor 306 for further processing through, gate switch 350, band pass filter 310 and low pass, lag filters 312 and 314. The down conversion provided by mixer 342 results in a Doppler frequency ($F_D$) signal that is proportional to a downward velocity (V) of weapon 10. An amplifier 352 amplifies the Doppler frequency signal before it is input to gate switch 350, which is activated at a time after transmission of the radar signal that is consistent with the reference altitude and desired detonation altitude. Received radar return signals that pass through gate switch 350 are received by band pass filter 310. A filtered radar return output from band pass filter 310 is rectified utilizing rectifier 354 which results in signals that are input into lag filters 312 and 314 whose output are then compared by comparator 360.

To prevent triggering of comparator 360 by radar receiver noise and other noise sources, a voltage reference 362 provides a threshold voltage to comparator 360 which eliminates false alarm triggering due to receiver noise. The threshold voltage is combined with the output of the filter (lag filter 312) having the shortest time constant. As illustrated, the combination utilizes diodes 364 and 366 and is sometimes referred to as a diode OR. The combination of the voltage reference 362 and the shorter response time of lag filter 312 causes the threshold level, which is the negative input of comparator 360, to always lead the signal (output of lag filter 314) that is input into the positive input of comparator 360. This mechanization ensures that a detonation signal will not be generated based on fast rising edges that results from radar return signals from targets off to the side of the trajectory of a weapon.

Figure 9:
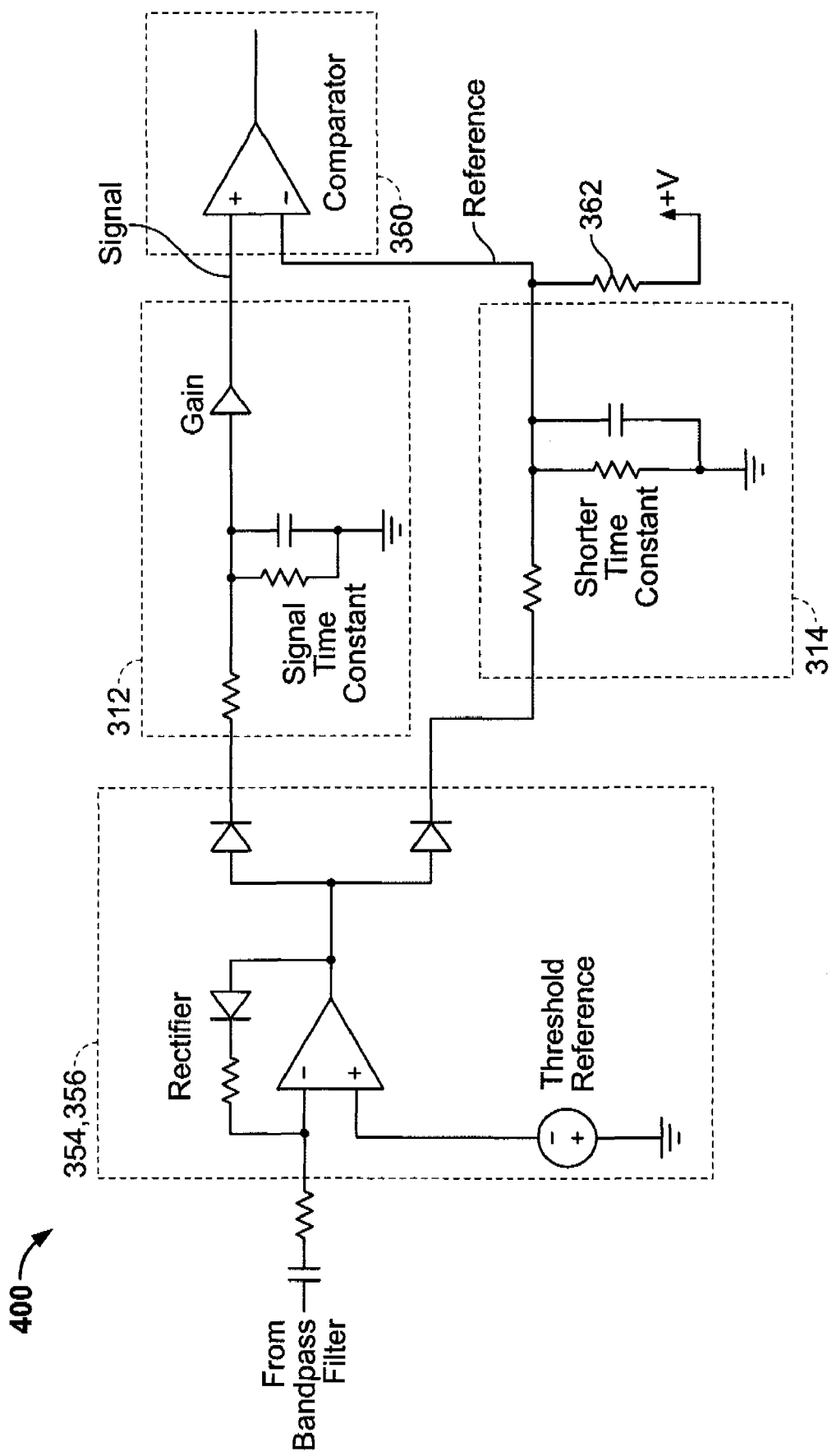
FIG. 9 is a schematic diagram of one embodiment of a comparator circuit that can be utilized in the signal processing section of FIG. 8.
Figure 11:
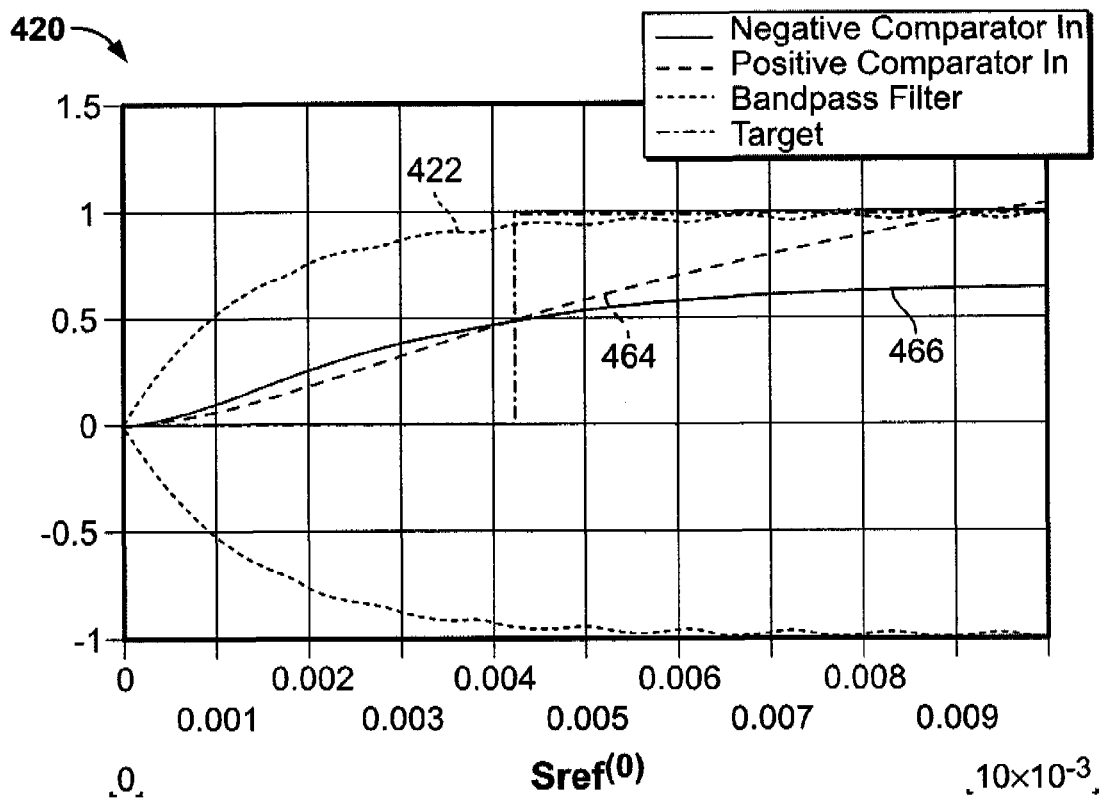
FIG. 11 illustrates a response for the circuit of FIG. 9 at the center frequency of the band pass filter.
Figure 12:
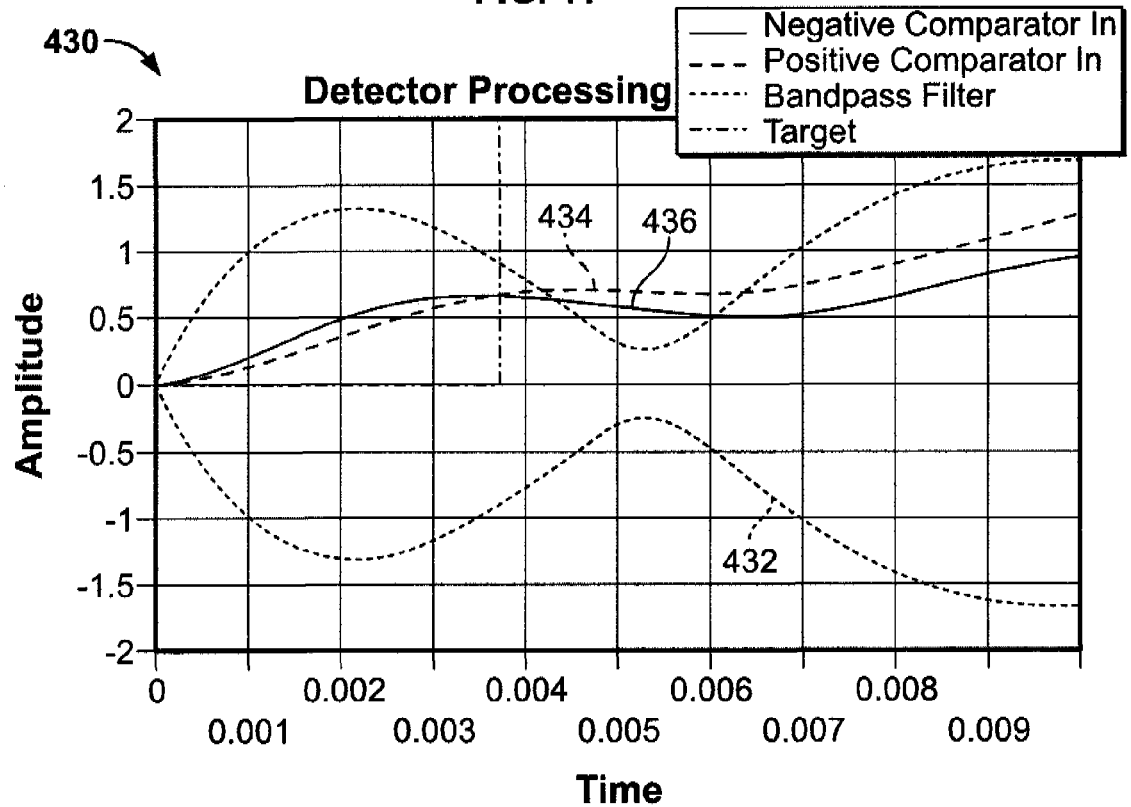
FIG. 12 illustrates a response for the circuit of FIG. 9 at a frequency one-half bandwidth from the center frequency of the band pass filter.
Figure 13:
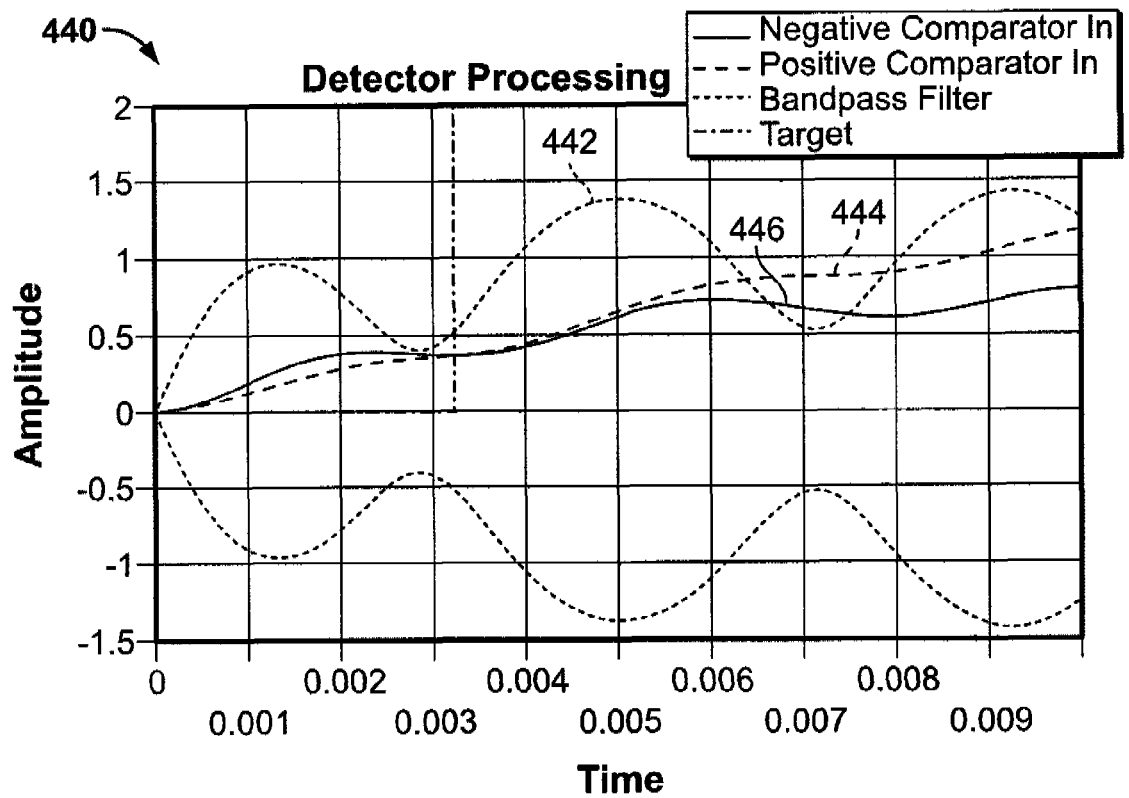
FIG. 13 illustrates a response for the circuit of FIG. 9 at a frequency one bandwidth from the center frequency of the band pass filter.
Figure 14:
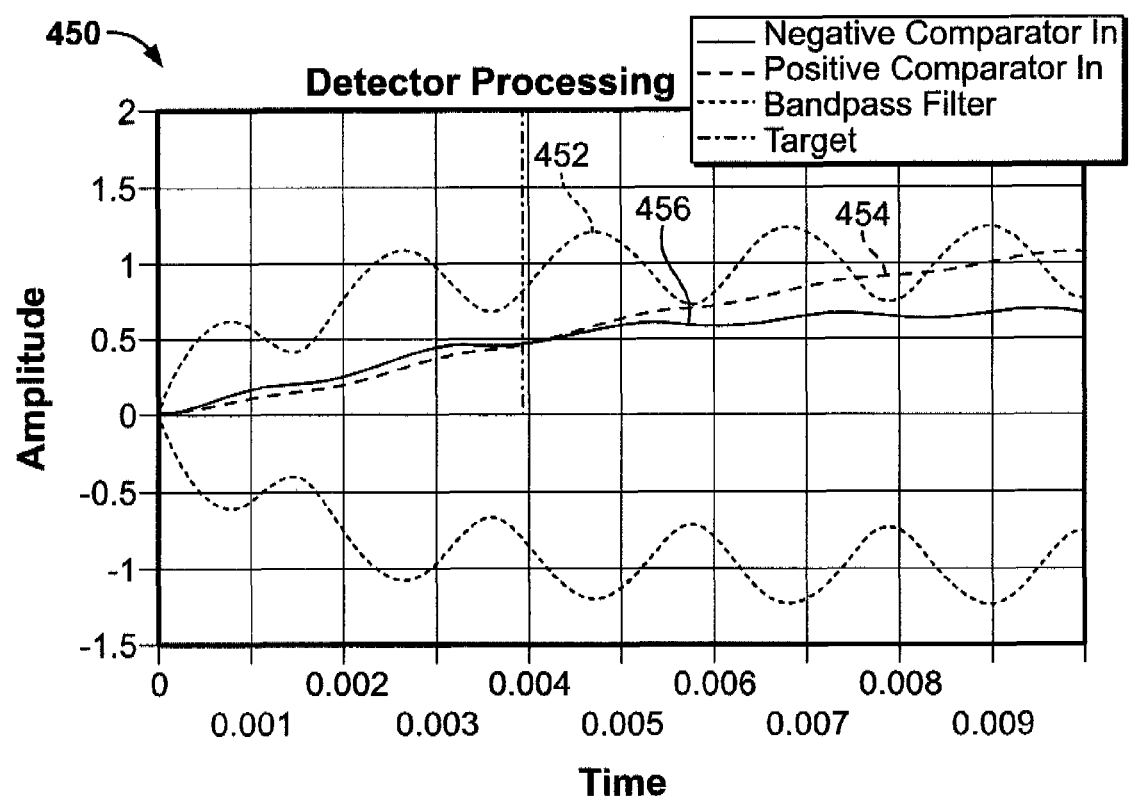
FIG. 14 illustrates a response for the circuit of FIG. 9 at a frequency two bandwidths from the center frequency of the band pass filter.
Figure 15:
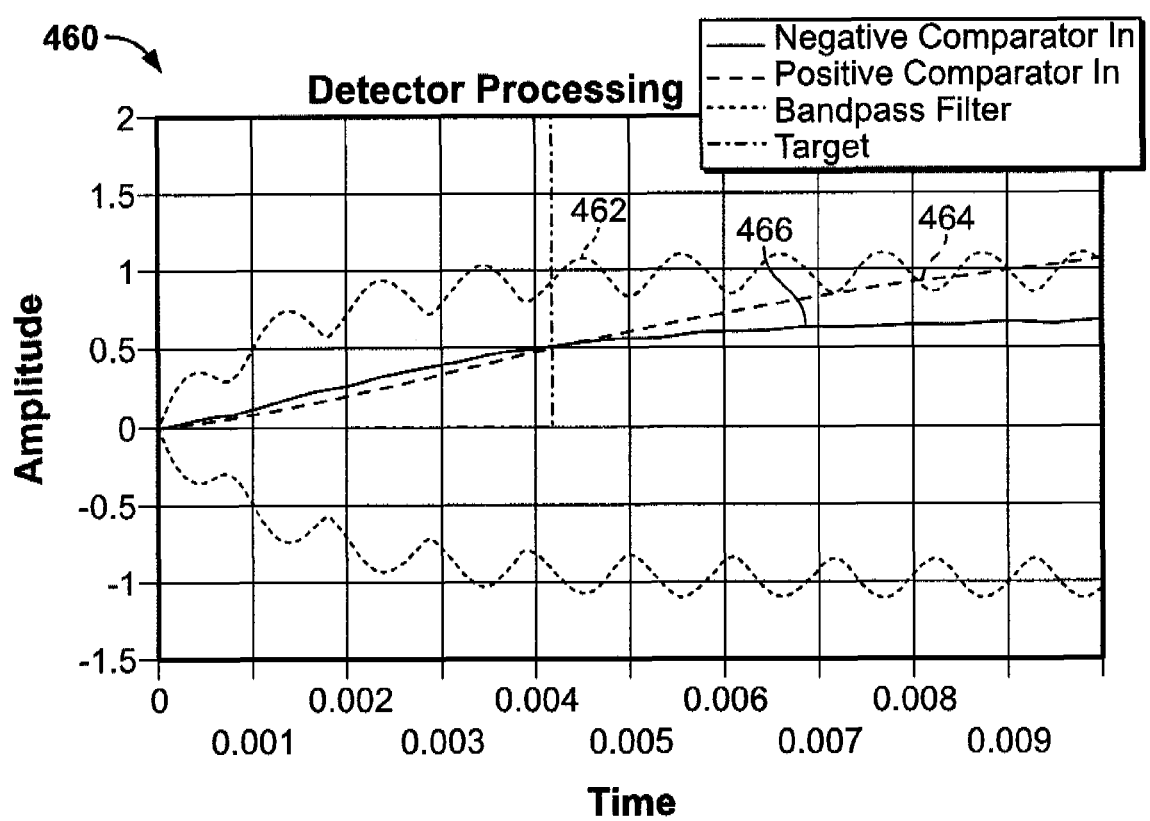
FIG. 15 illustrates a response for the circuit of FIG. 9 at a frequency four bandwidths from the center frequency of the band pass filter.

FIG. 9 is a schematic diagram 400 of one embodiment of the above described comparator circuit. In the embodiment, the signal being input to the reference input of comparator 360 has a much faster charge time than the signal being input into the signal input of comparator 360. Therefore, the threshold for a signal being output by comparator 360 is raised for shorter time constant signal inputs. These short time constant signals, or events, tend to occur when off frequency components (signals offset from the center frequency) are applied to the band pass filter 310 (shown in FIG. 8). These off frequency components raise the threshold on the reference side of the comparator 360. By raising the threshold, the response to off frequency components (which have shorter rise times than the true signal) is reduced and the active rectifier 354 prevents a response to inputs less than the threshold value provided by a threshold reference 402 which is set above a noise level.

The two lag circuit of filters 312 and 314 operate to prevent false triggering due to lower frequency radar returns to the side of the vehicle. In one embodiment, both lag filters 312 and 314 receive the same input signal and the filter with the slower response (filter 312) includes a gain component with a gain of about 1.1. The reference side lag (filter 314) has the shorter time constant, and the signal side lag (filter 312) has the larger time constant.

Further flexibility in the response of comparator 360 can be achieved if lag filters 312 and 314 are configured with variable rise and fall times, in essence being configured as peak detectors. The active rectifier 354 has no response to signals less than a set threshold, where the threshold would be set well above receiver noise. Additionally a bias resistor 356 is set to apply a slightly positive bias on the negative channel of comparator 360 to prevent a detonation output for no signal input conditions.

Figure 10:
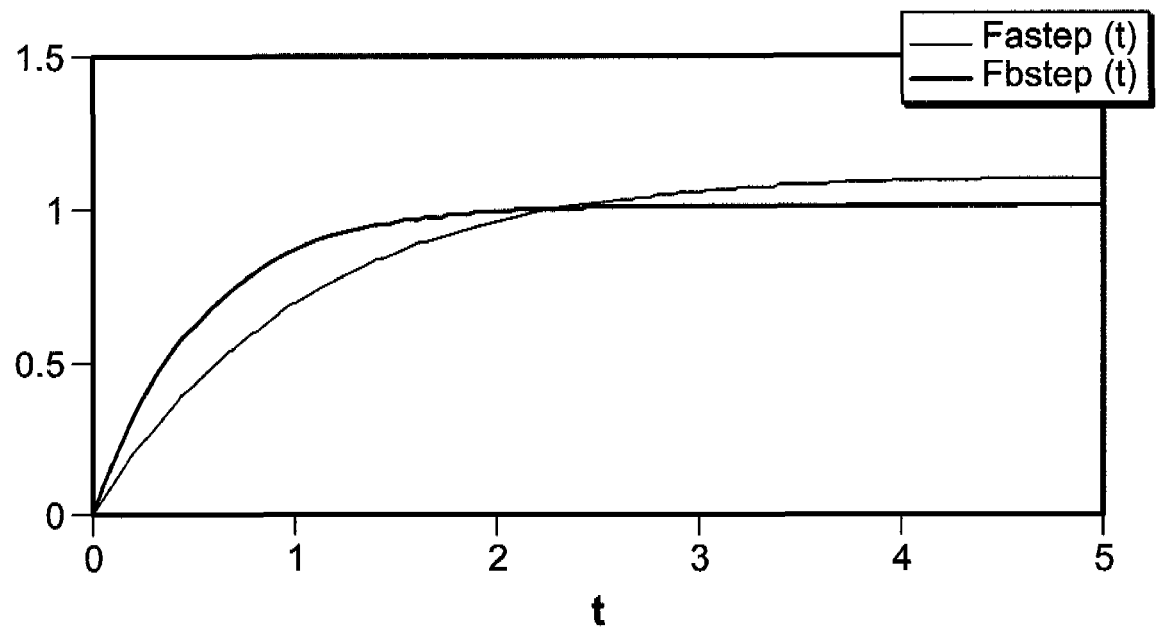
FIG. 10 illustrates operation of the two lag filter circuits of FIG. 9

In this embodiment, and as further illustrated by FIG. 10, an output of comparator 360 transitions to a high state at about t equal to 2.3. This transition time is independent of the amplitude of the inputs. In the embodiment where the applied signal is the output of band pass filter 310 responding to a desired Doppler component, and more rapidly rising off frequency components, the effect of fast rise time components are inherently minimized because the fast rise time components more rapidly raise the level of the negative comparator input preventing the off frequency components from triggering an early detonation, which occurs when the output of comparator 360 transitions to a high state.

In summary the proposed detection method provides signal integration and detection with reasonably constant delay which is relatively independent of amplitude and inherently rejects triggering on fast low amplitude signal components in the composite waveform from the band-pass filter. Since the delay is reasonably constant its effects can also be calibrated out of the sensor.

FIGS. 11-15 include a plurality of graphs 420, 430, 440, 450, and 460 respectively, illustrating responses for the comparator circuit (outputs of band pass filter 310 and of comparator 360) illustrated and described with respect to FIGS. 8 and 9. More specifically, graph 420 is an illustration for a response 422 (an output of band pass filter 310) at the center frequency of the band pass filter 310. Graph 420 further includes both a signal 424 and a reference signal 426 that is input into comparator 360. Graph 430 is an illustration of the response 432 (an output of band pass filter 310) for the circuit of FIG. 9 at a frequency one-half bandwidth from the center frequency of the band pass filter 310. Graph 430 further includes both a signal 434 and a reference signal 436 that is input into comparator 360.

Graph 440 is an illustration of the response 442 (an output of band pass filter 310) for the circuit of FIG. 9 at a frequency one bandwidth from the center frequency of the band pass filter. Graph 440 further includes both a signal 444 and a reference signal 446 that is input into comparator 360. Graph 450 is an illustration of the response 452 (an output of band pass filter 310) for the circuit of FIG. 9 at a frequency two bandwidths from the center frequency of the band pass filter. Graph 450 further includes both a signal 454 and a reference signal 456 that is input into comparator 360. Graph 460 is an illustration of the response 462 (an output of band pass filter 310) for the circuit of FIG. 9 at a frequency four bandwidths from the center frequency of the band pass filter. Graph 460 further includes both a signal 464 and a reference signal 466 that is input into comparator 360.

As can be seen from graphs 420, 430, 440, 450, and 460, implementation of lag filters 312 and 314 and comparator 360 provides a mechanism to prevent false trips (incorrect detonation signals) for the detonation of munitions, due to side targets near the trajectory path. Particularly, detonation signals cannot be generated until the a signal present at the signal input of comparator 360 is greater than a reference signal (which has a faster rise time) that is input into the reference input of comparator 360. As such, the described configuration is that the time to detonation height detection is relatively time independent of the band-pass filter level.

Specific to the detonation of munitions, FIGS. 11-15 illustrate simulated responses for a vehicle with a vertical velocity component of about 750 m/sec which yields a Doppler frequency corresponding to about 21.5 KHz, which is representative of a typical system. These simulated responses include a charge time constant of 0.5 Tau and a discharge time constant of 6 Tau for the reference (−) input of comparator 360. For the signal (+) input of comparator 360, the charge time constant is 5.0 Tau and the discharge time constant is 5.5 Tau, where Tau is the time constant (to 63% of the final value) of the envelope of band pass filter 310, about 1.3 millisecond for the representative examples in FIGS. 11-15. FIGS. 11-15 illustrate the relatively small effect of lower frequency components on the signal detection time, on the order of about one millisecond or about a 0.75 meter variation in the detonation point for a vehicle velocity of approximately 750 meters/sec.

While the invention has been described in terms of various specific embodiments, those skilled in the art will recognize that the invention can be practiced with modification within the spirit and scope of the claims.

What is claimed is:

1. A method for generating a weapon detonation signal at a desired weapon detonation altitude, said method comprising:
    applying radar return signals to a radar range gate, the radar range gate set to correspond to a reference altitude;
    applying an output of the radar range gate via a first diode to first filter configurable to have a first time constant for a rise time and a second time constant for a fall time;
    applying the output of the radar range gate via a second diode to second filter configurable to have a third time constant for a rise time and a fourth time constant for the fall time; and
    initiating a countdown to detonation when an output of the second filter attains an amplitude greater than an output of the first filter.

2. A method according to claim 1 further comprising coupling an output of the first filter to a reference voltage.

3. A method according to claim 1 further comprising configuring the range gate as a band pass filter.

4. A method according to claim 1 wherein initiating a countdown to detonation when an output of the second filter attains an amplitude greater than an output of the first filter comprises:
    inputting an output of the first filter to a reference input of a comparator; and
    inputting an output of the second filter to a signal input of the comparator.

5. The method of claim 1, wherein the first time constant is shorter than the third time constant such that the second filter has a slower rise time than the first filter.

* * * * *

UNITED STATES PATENT AND TRADEMARK OFFICE
CERTIFICATE OF CORRECTION

PATENT NO.        : 7,652,615 B2                                      Page 1 of 1
APPLICATION NO.   : 11/420574
DATED             : January 26, 2010
INVENTOR(S)       : Thomas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Twenty-third Day of November, 2010

David J. Kappos
*Director of the United States Patent and Trademark Office*